Dec. 5, 1961  D. E. GOLAY  3,011,475
HOG FARROWING PEN
Filed June 18, 1959  2 Sheets-Sheet 1

INVENTOR
DONAVEN E. GOLAY
BY Herbert Q. Weintraub
ATTORNEY

Dec. 5, 1961 D. E. GOLAY 3,011,475
HOG FARROWING PEN

Filed June 18, 1959 2 Sheets-Sheet 2

INVENTOR
DONAVEN E. GOLAY
BY Herbert A. Minturn
ATTORNEY

United States Patent Office 3,011,475
Patented Dec. 5, 1961

3,011,475
HOG FARROWING PEN
Donaven E. Golay, Cambridge City, Ind., assignor to Chore-Boy Manufacturing Co., Inc., Cambridge City, Ind.
Filed June 18, 1959, Ser. No. 821,245
4 Claims. (Cl. 119—20)

This invention relates to a farrowing pen for sows. A primary object of the invention is to provide a pen which will provide the utmost comfort for the sow over a period running from before farrowing until after a period after farrowing.

The invention is embodied in a structure which will give the sow an exercising and feeding compartment and will insure that the sow is restricted in lying down in another compartment in a manner which will insure that the sow will lie on opposite sides alternately from time to time while in the restricted area. Furthermore it is an object of the invention to provide such a restricted area as will not upset the nervous system of the sow to that extent that she resists entering the restricted area and remaining therein particularly immediately before, through, and after farrowing.

This is accomplished by providing an area greater in width for the head of the sow than is permitted for the body. Also advantage is taken of the natural instinct of the sow to place her body against a solid wall affording some support to her back with her feet and legs extending oppositely therefrom.

Figure 3:
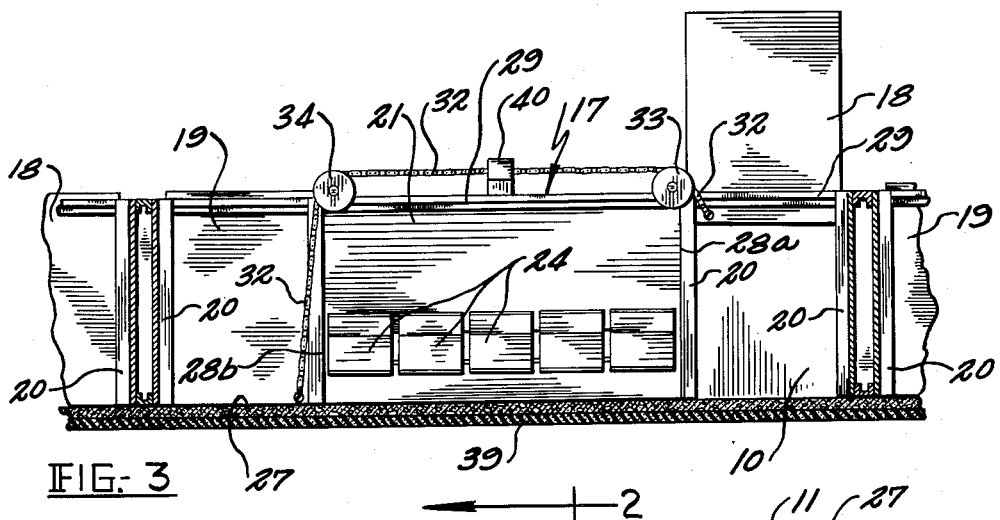
Figure 1:
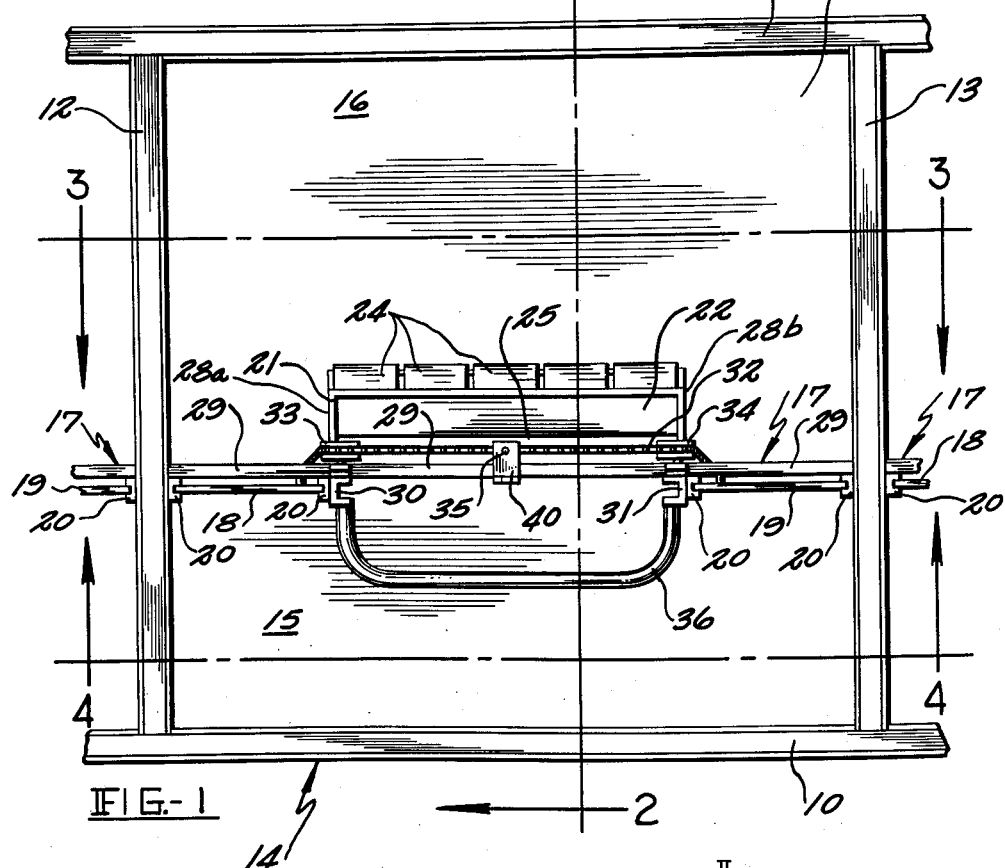
Figure 2:
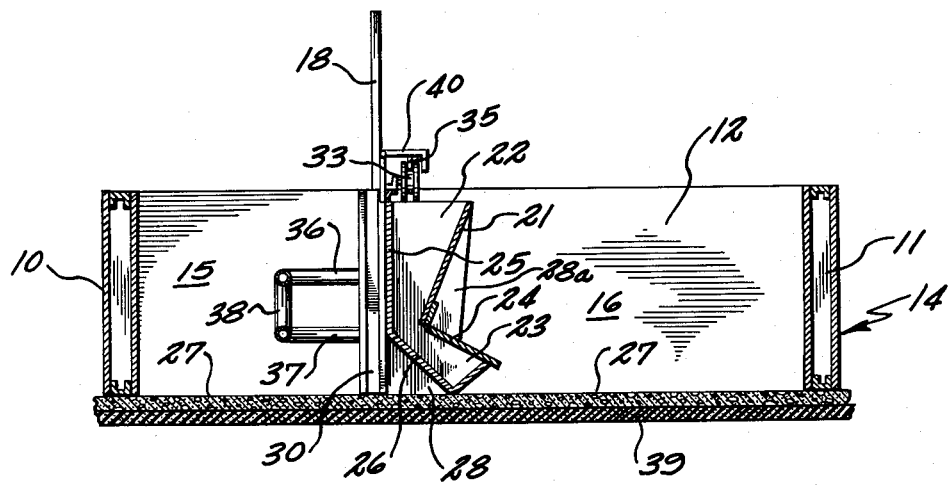
Figure 4:
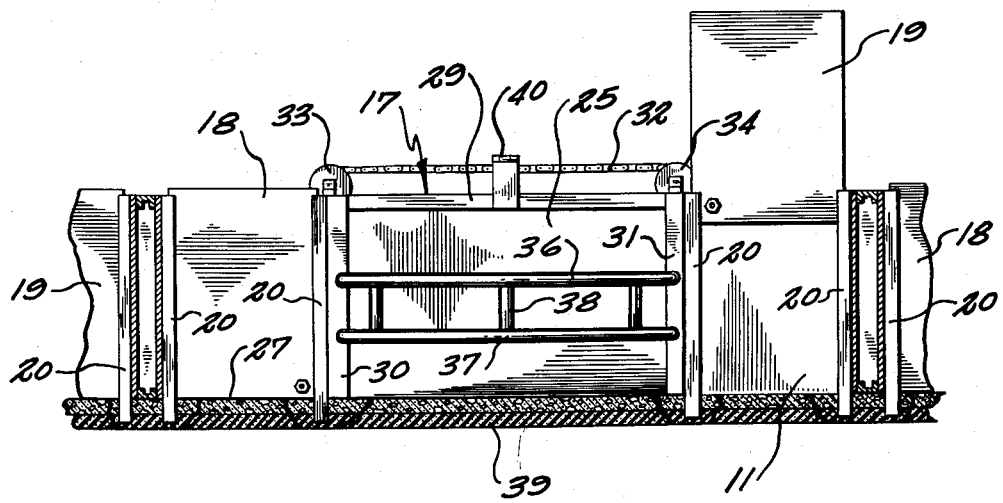

These and many other objects and advantages of the invention will become apparent in the following description of one particular form of the invention as illustrated in the accompanying drawings, in which FIG. 1 is a view in top plan of a single farrowing pen;
FIG. 2 is a view in transverse vertical section on the line 2—2 in FIG. 1;
FIG. 3 is a view in vertical, longitudinal section on the line 3—3 in FIG. 1; and
FIG. 4 is a view in vertical, longitudinal section on the line 4—4 in FIG. 1.

Normally there will be a number of farrowing pens one after another along an alleyway. However but one such pen is shown and described herein. Front and back walls 10 and 11 are provided to have intervening, spaced apart side walls 12 and 13. Preferably, although not necessarily so, all of these four walls will be solid with the exception of possibly the front wall 10 which will have a door therethrough from the alley-way (not shown). In the one form herein shown, these walls 10, 11, 12, and 13 are made of smooth metal particularly for sanitation purposes, and also for durability. By making the walls 11, 12, and 13 particularly solid without opening therethrough prevents the sow within those walls being disturbed by occupants of adjacent pens.

The pen generally designated by the numeral 14 is divided longitudinally into a smaller area 15 which is the farrowing area proper, and a larger area 16 serving as an exercising and feeding area.

These two areas 15 and 16 are separated by a partition generally designated by the numeral 17, which partition is composed of two end doors 18 and 19 preferably vertically shiftable. These doors 18 and 19 may be suitably guided in their vertical travel from a lower closed position in each instance to an upper position by any suitable means, herein shown as by channel irons 20 between which the respective doors 18 and 19 are slidingly guided. Between the two doors 18 and 19 is placed a feeder 21. This feeder 21 is of the usual construction having an upper hopper portion 22 opening into a lower trough 23, and over which trough 23 there is a plurality of doors 24, FIGS. 1, 2, and 3. The hopper 22 has a vertically disposed back 25 which serves as a major portion of the partition extending between the doors 18 and 19. The feeder 21 has a floor 26 inclined downwardly from the underside of the wall 25 to form a side of the trough 23, affording considerable space immediately below this floor 26 and the floor 27 of the pen. This space is indicated by the numeral 28. The sides 28a and 28b of the feeder 21 extend to the floor and close off the ends of the space 28.

The upper end portion of the partition 17 is defined by a bar 29 which is fixed by its ends to the respective side walls 12 and 13. The channels 20 have their upper ends fixed to this bar 29 in spaced apart relation, receiving the doors 18 and 19 therebetween as above indicated, and the lower ends of these channels 20 are anchored to or in the floor 27. The feeder 21 is anchored to upright posts 30 and 31, one at each end of the feeder 21, and these posts 30 and 31 are in turn secured to the bar 29 as well as to the channel bars 20.

The doors 18 and 19 are preferably interconnected by some suitable mechanism whereby when one door such as door 18 is raised, the other door 19 will be lowered as indicated in FIGS. 2 and 3. One such means is shown herein as consisting of a cable or a chain 32 running over pulleys 33 and 34 mounted on the bar 29, and thence by respective ends down to lower ends of the doors 18 and 19. In order to prevent the sow from moving the doors 18 or 19, as they are wont to do from time to time, a latch device is provided, herein shown as consisting of a simple hinged leaf 40 mounted on the bar 29, and having a pin 35 dropping down into the open spaces between links of the chain 32.

Extending into the area 15 is a pair of vertically spaced apart, elongated U-bars or tubes 36 and 37. These bars 36 and 37 are symmetrically shaped and have their ends secured to the upright posts 30 and 31 in spaced apart relation, this spacing being maintained by the spacer members 38, herein shown as three in number. The lower bar 37 is mounted above the floor 27 a desired distance, such as one foot or even higher. The spacing between the bars 36, 37 and the wall 10 is made to be such that a sow may walk freely therebetween and yet may not turn around. That is, once a sow enters between the bars 36, 37 and the wall 10, she will either have to go on around or back up through one of the doors depending upon the direction in which she has entered the area 15.

Assuming that a sow is in the area 16, she has access to feed in the feeder 21 in the usual manner by lifting one of the doors 24. Water will also be supplied in this area, the conventional watering means not being shown. Assuming that the door 19 is in its elevated position, that is in the open position, a sow will enter through the door 19 into the area 15, the door 18 being closed. In the normal course of events, the sow will lie down with her back braced against the front wall 10 and her legs extending outwardly, normally to either side of the ends of the bars 36 and 37, and her head directed toward the wall 12. The door 18 will remain closed as it is desired to keep the sow in that area 15. The chain 32 may be disconnected from the door 18, to close the door 19, however this is normally not necessary until the sow is to leave the pen, so that when the door 19 is closed behind the sow, the door 18 will be open. At the time of farrowing, the sow will be perfectly contented to lie as indicated with her head toward the wall 12. Supposing that the sow will be in the area 15 for a day or so at least before farrowing, she will come out through the door 18 when hungry or desirous of exercise, going into the area 16, whereupon the door 18 is allowed to remain open and the door 19 remain closed so that when the sow enters the area 15 again she is headed in the opposite direction from that she had taken in entering through the door 19 previously. Her head will then be directed toward the wall 13 which reverses her position, and consequently reverses the side upon which she lies. This is purposely done in order to provide the opposite side positions of the sow which greatly help in developing an even udder on both sides of the sow for the better suckling of pigs.

Then the pigs when farrowed, the sow having her back against the wall 10, will instinctively come around to the udder side of the sow which is below the bars 36 and 37, and within a very short period of time, after having identified themselves with their particular teats in the normal course of events, will, upon being satisfied, gather together underneath the floor 26 of the feeder 21, well back of the bars 36 and 37 so should the sow become restless and get up and lie down, the danger of their being caught under the sow and killed is greatly lessened. It is also the nature of pigs to like to have something above their backs, fairly close, and the provision of this inclined floor 26 serves that purpose.

In the drawing, it is shown that there is a concrete floor, quite thin, laid over an insulating medium 39 so that the concrete floor 27 always has a feeling of warmth since heat is not conducted away to any considerable extent upon contact with the floor in view of the insulation thereunder. As in the usual, modern procedure, a conventional heat lamp (not shown) may be suspended immediately over that area bounded by the bar 29 and the upper bar 36 to provide heat under extremely outer cold conditions whereby the pigs may gather under the rays of that lamp for warmth in a shelter area. That is an old procedure, and does not enter per se into the invention herein shown and described.

A new development in the raising of hogs may be employed with the pen herein constituting the invention. When the pigs approach weaning time, the sow may be removed and the pigs left within the pen 14, with the doors 18 or 19 then being left permanently open so that the pigs may run back and forth from the areas 15 and 16, using the area 15 as their sleeping quarters. In this manner, the pigs may be grown to maturity without being removed from the pen 14 until ready to be marketed. A great saving of feed is not only had in such a procedure, but also there is less risk of disease to be had as opposed to the normal roaming of pigs over pasture fields or contaminated hog lots.

Therefore it is to be seen that I have provided a unique structure for the purposes described, and while I have described the invention in the one particular form, it is obvious that structural changes may be employed without departing from the spirit of the invention, and I therefore do not desire to be limited to that precise form beyond the limitations which may be imposed by the following claims.

I claim:

1. A farrowing pen comprising boundary walls; a partition between opposite walls dividing the pen into two compartmental areas, one a farrowing area and the other a feeding area; a feeder along said partition available to the feeding area; a pair of doors in said partition, one at each end thereof; and guard means extending from said partition between said doors over a portion of said farrowing area, and extending toward a pen wall defining a hover in said farrowing area, and opposite said partition, the spacing between said means and said farrowing area side being limited to that permitting a sow to walk and lie down but preventing her turning around therebetween; and door interconnecting means opening one of said doors upon the closing of the other door.

2. A farrowing pen comprising boundary walls; a partition between opposite walls dividing the pen into two compartmental areas, one a farrowing area, and the other a feeding area; a feeder along said partition available to the feeding area; a pair of doors in said partition, one at each end thereof; guard means extending from said partition between said doors over a portion of said farrowing area, and extending toward a pen wall defining a hover in said farrowing area, and opposite said partition, the spacing between said means and said farrowing area side being limited to that permitting a sow to walk and lie down but preventing her turning around therebetween; a back wall of said feeder forming an intermediate length of said partition; and said back wall having a recess thereunder as a pig crawl space from said farrowing pen area under the feeder; and guard means being located across the back wall of said feeder.

3. A farrowing pen defined by four approximately straight walls; a straight line partition intermediate opposite walls dividing the pen into two compartments; said partition comprising in part a self-feeder having a feeding side exposed along one side thereof in one of said compartments and having a reentering space under the feeder opening into the other compartment; a guard extending from said feeder above said space into said other compartment and toward a wall opposite the feeder defining a pig hover in part in said space and in part under said guard, the spacing of the guard from said opposite wall being restricted to a sow walk-through space; and a door between each end of said feeder and the pen walls between the ends of which said partition extends.

4. A farrowing pen comprising boundary walls; a partition between opposite walls dividing the pen into two compartmental areas, one a farrowing area and the other a substantially larger feeding and exercising area; a feeder means including means for automatically supplying feed thereto along said partition available to the feeding area; a pair of doors in said partition, one at each end thereof; and guard means extending from said partition between said doors over a portion of said farrowing area, and extending toward a pen wall defining a hover in said farrowing area and opposite said partition, the spacing between said means and said farrowing area side being limited to that permitting a sow to walk and lie down but preventing her turning around therebetween.

References Cited in the file of this patent

UNITED STATES PATENTS

| | | |
|---|---|---|
| 2,263,069 | Coyner | Nov. 18, 1941 |
| 2,740,379 | Collins | Apr. 3, 1956 |